(12) United States Patent
Brooks

(10) Patent No.: US 9,568,937 B1
(45) Date of Patent: Feb. 14, 2017

(54) TAP SWITCHING POWER SUPPLY APPARATUS AND METHODS FOR SUPPORTING MULTIPLE INPUT VOLTAGES

(71) Applicant: Time Warner Cable Enterprises LLC, New York, NY (US)

(72) Inventor: Paul D. Brooks, Weddington, NC (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

(21) Appl. No.: 15/048,861

(22) Filed: Feb. 19, 2016

(51) Int. Cl.
G06F 1/20 (2006.01)
G05F 5/00 (2006.01)
H01F 27/29 (2006.01)
H01H 47/22 (2006.01)
H02P 13/00 (2006.01)

(52) U.S. Cl.
CPC ............... *G05F 5/00* (2013.01); *H01F 27/29* (2013.01); *H01H 47/22* (2013.01); *H02P 13/00* (2013.01)

(58) Field of Classification Search
CPC .............. G05F 1/20; G05F 1/14; G05F 1/24; G05F 1/42; G05F 1/30; G05F 5/00; H02M 5/04; H02M 5/225; H02M 5/10; H02M 5/12; H02M 5/16; H02M 5/18; H02M 5/257; H02M 5/2573; H02M 5/2576; H02P 13/00; H02P 13/06; H01F 27/29; H02H 47/22
See application file for complete search history.

(56) References Cited

U.S. PATENT DOCUMENTS

| | | | | |
|---|---|---|---|---|
| 4,219,759 A * | 8/1980 | Hirschfeld | ............. | H02P 13/06 315/146 |
| 6,218,744 B1 * | 4/2001 | Zahrte, Sr. | ............... | G05F 1/14 307/64 |
| 7,154,251 B2 * | 12/2006 | Fattohi | .................... | H02M 5/10 323/256 |
| 2006/0022783 A1 * | 2/2006 | Owen | .................... | H01F 30/12 336/5 |
| 2008/0074073 A1 * | 3/2008 | Genkawa | ................ | H02P 13/06 318/779 |
| 2010/0213921 A1 * | 8/2010 | Abolhassani | ......... | H01F 27/385 323/328 |
| 2013/0187622 A1 * | 7/2013 | Kreischer | ............. | A61B 5/055 323/255 |

\* cited by examiner

*Primary Examiner* — Timothy J Dole
*Assistant Examiner* — Shahzeb K Ahmad
(74) *Attorney, Agent, or Firm* — Michael P. Straub; Stephen T. Straub; Ronald P. Straub

(57) ABSTRACT

A device and method(s) for implementing an AC line-powered primary-tap switching power supply which is easily or automatically switchable between a first configuration which supports a first input voltage, e.g., a 120 VAC input voltage, and a second configuration which supports a second input voltage, e.g., a 240 VAC input voltage, which is an integer multiple of the first input voltage, is described.

10 Claims, 7 Drawing Sheets

TAP SWITCHING POWER SUPPLY APPARATUS AND METHODS FOR SUPPORTING MULTIPLE INPUT VOLTAGES

FIELD

The present invention relates to power supply methods and apparatus and, more particularly to methods and apparatus for implementing and using a tap switching power supply which is capable of supporting at least two different input voltages and which may be used for various applications, e.g., Cable TV network and/or other applications where different input voltages may need to be supported depending on the location the power supply is to be placed in a network.

BACKGROUND

CATV power supplies have used tap switching on the primary (input) winding for several years now. Such an approach allows for automatic switching of taps in the event that small changes input voltage are detected, e.g., at different locations where the power supply is deployed or during deployment due to changes to the input side conditions. Such tap switching power supplies allow for a good match between the input line voltage and the load when there is a relatively small change of input line voltage e.g., a change of 40V or less for example, A drawback of this design is that the use of multiple taps on the input side along with the control circuitry used to determine which taps are used in the input side depending on the actual input voltage within the small range of input voltages which are supported make it difficult to implement a power supply which efficiently supports a much wider range of input voltages, e.g., a range where some of the input voltages are twice or more than the lowest support input voltage.

For this reason, tap switching power supplies used for cable TV network applications are generally limited to supporting a nominal input voltage and a limited range of voltages around the nominal input voltage with the range of voltages usually corresponding to a small fraction of the nominal input voltage. For example, a conventional tap switching input power supply with a nominal 120 Volt AC input might support a working input voltage range of 100V to 130V. Similarly a conventional tap switching power supply with a nominal 240V input may support a small range of input voltages around the 240V nominal input value.

Given the differences between 120V and 240V tap switching power supplies, service personal, who may be required to replace 120V or 240V power supplies, normally need to stock both types of supplies in their truck when going on one or more service calls where the line currents that may be encountered are not known ahead of time. This is particularly important if a service technician may be directed on a service call while on the road, since in such a case the service technician may not have time to update the inventory on the service truck prior to proceeding on the service call.

In view of the above discussion it should be appreciated that there is a need for methods and/or apparatus which would allow a single tap switching power supply to be used for both 120V and 240 input voltages and/or for a tap switching power supply which could be easily reconfigured by a service technician from a 120 V mode of operation to a 240 V mode of operation or vice versa to allow for the same power supply to be used in either a 120V or 240V application.

SUMMARY

Methods and apparatus for implementing alternating current (AC) line-powered primary-tap switching power supplies are described. The power supplies are easily or automatically switchable between a first configuration which supports a first input voltage range, e.g., a 120V AC input voltage range, and a second configuration which supports a second input voltage range, e.g., a 240V AC input voltage range. The intended input voltage of the second range, also referred to as the nominal input voltage of the second range since the actual input voltage may be different from the intended input voltage, is in some embodiments an integer multiple of the nominal input voltage of the first input voltage range. For example, in the case of 240V and 120V the second nominal input voltage 240V is twice the first nominal input voltage 120V. While the first and second ranges include the nominal values corresponding to the particular ranges, the power supplies are intended to support voltages which are above or below these ranges, e.g., 10 or 20 volts above or below these ranges or more in some embodiments.

Fully automated embodiments are described and contemplated in which input voltage is sensed and a ganged switch is controlled to automatically switch the mode of operation to a first mode corresponding to a first voltage range when the input voltage is detected to be within the first voltage range and to switch the power supply into a second mode of operation when the input voltage is detected to be within a second voltage range corresponding to the second mode of operation. The ganged switch configures the power supply by determining how a plurality of different transformer taps are connected and thus used within the power supply.

In another embodiment, rather than use a ganged switch and automatic control to control the mode of power supply operation, the power supply is manually configured. Rather than require a user to manually change the positions of multiple individual jumpers which can be confusing and lead to errors, in some embodiments a plug or connector with a predetermined set of interconnects is used with the connections established by insertion of a first plug configuring the power supply to operate in a first mode of operation and insertion of a second plug, e.g., interconnect device, configuring the device and tap connections for the power supply to operate in the second mode of operation. Thus, the plug serves as a jumper device which is capable of jumping multiple terminals to achieve an interconnect configuration corresponding to one of the supported voltage ranges.

In some embodiments an interconnect plug for 120V operation is colored a first color and labeled 120V and a second interconnect plug used to configure the power supply for 240V mode operation is colored a second color and labeled 240V, where the second color is different from the first color.

Thus, in some embodiments, a connector plug is used to determine whether the power supply is configured for a first, lower input voltage range, e.g., a 120V nominal input voltage range, or a second higher voltage range, e.g., a 240V nominal input voltage range with the installer selecting and inserting the plug at the time of power supply installation at a site based on the input voltage at the site.

By controlling the configuration via the use of a simple plug, the installer can control the configuration and/or change the configuration by simply installing or changing the connecter plug without having to modify multiple individual tap connections one at a time and without having to understand the tap connection changes which are made by installing or changing the connector plug.

While the auto configuration or plug based configuration are useful and facilitate easy use at a site, various features of the power supply provide for relatively low cost implementation of these configuration options while still providing good reliability.

In at least some embodiments the power supply uses a multi-tap transformer with first and second sets of taps which allow for transformer winding to be arranged in series or parallel depending on the mode of operation.

When configured to operate in the first lower voltage mode of operation, transformer windings corresponding to the first and second sets of taps on the input side of the transformer are used in parallel to split the current between the windings corresponding to the upper and lower sets of taps and thus reduce the amount of current passing through the windings corresponding to the first or second sets of taps as compared to if the current flowed through just one set of windings. During the second higher voltage mode of operation, windings corresponding to the first and second sets of taps are used in series with the number of windings on the primary (input) side through which the current flows before reaching the return conductor, resulting in an increased voltage step down ratio with respect to the secondary load (output) side due to the greater number windings through which the current passes during the second mode of operation when the input voltage is the higher, e.g., 240V, input. The use of at least some of the input transformer windings which were used in parallel during the first mode of operation in series during the second mode of operation allows for a large number of the transformer windings to be used in both modes. Thus both high and low voltage input modes of operation can be supported without the need to use a transformer with a single set of windings on the primary side that can support the current expected to be passed through the transformer during the lower voltage mode of operation. Thus the transformer makes efficient use of the windings in both the high and low voltage modes of operation with the connections between the windings being changed, either automatically though the use of a ganged switch or manually via changing of an interconnect plug, depending on the mode of operation into which the power supply is placed into service at a given point in time.

While various exemplary embodiments and features have been described, numerous additional features and embodiments are described in the detailed description which follows.

BRIEF DESCRIPTION OF THE FIGURES

FIG. 5 comprises the combination of FIG. 5A, FIG. 5B and FIG. 5C.

DETAILED DESCRIPTION

While 120 volt AC is common in many households, higher voltages are often preferable in many applications since higher voltages allow for the same amount of power being delivered with less current as compared to lower voltage devices. This generally means less energy being wasted in the form of heat associated with the delivery of power to the device using the power. Use of higher voltage also often allows for smaller wires to be used since lower amounts of current need to be used to deliver the same amount of power allowing for cost savings in material.

Primary tap switcher circuits are used in many power supply circuits to optionally include in the circuit one or more additional series-connected input windings depending on input voltage and output load, so that the overall ratio of the input windings to the secondary windings will achieve the desired output voltage; this is intended to improve energy efficiency as compared to power supplies which use a fixed number of primary to secondary windings. Such power supplies also tend to provide tighter output voltage regulation, accommodate operation over a wider range of utility line voltages, and allow use of smaller, lighter, and lower cost transformers than power supplies with a fixed primary winding configuration.

The introduction of tap switching into the primary winding circuit complicated power supply design, resulting in power supplies being designed for 120V or 240V operation but not normally both.

Figure 1:
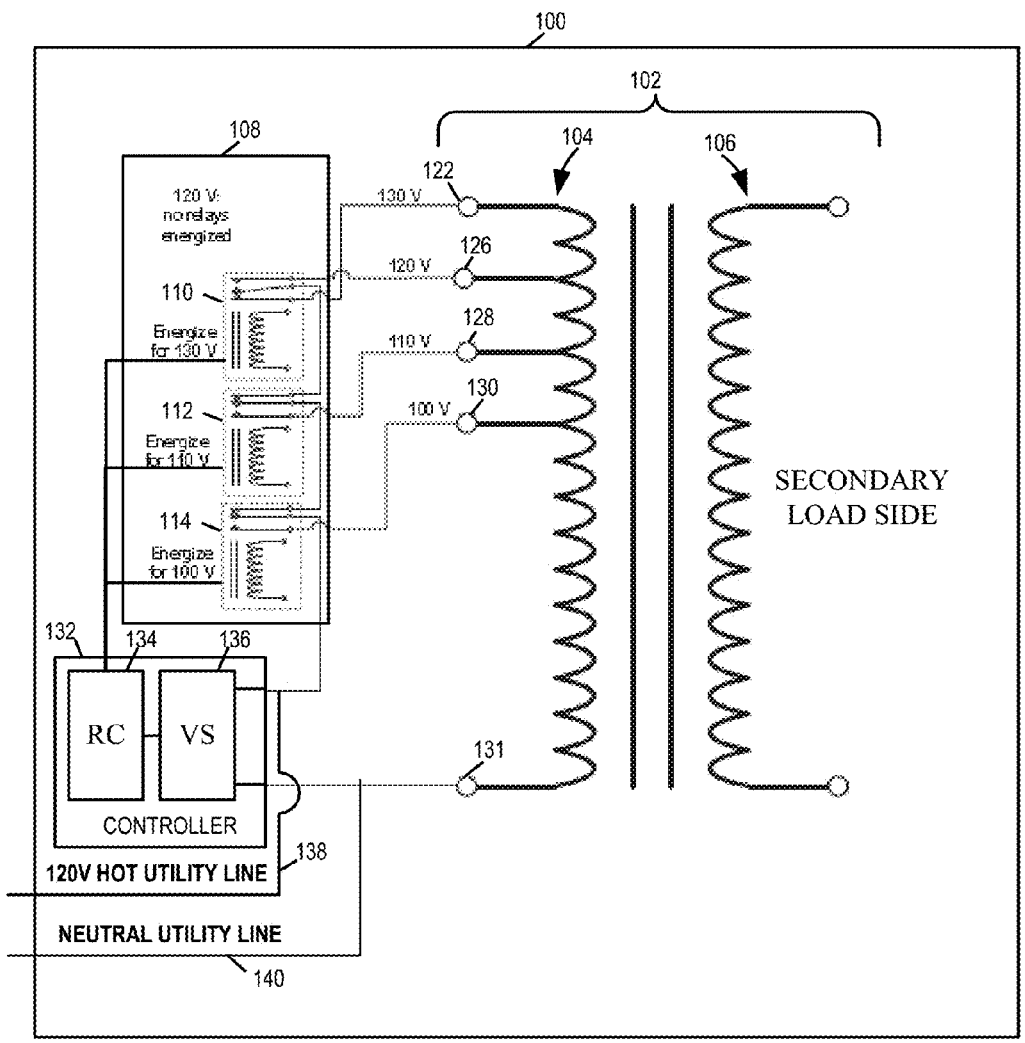
FIG. 1 illustrates an exemplary 120V input tap switching power supply.

FIG. 1 illustrates an exemplary 120V input tap switching power supply 100. The power supply 100 includes a controller 132, a relay module 108 which includes a set of input relays 110, 112, 114, a transformer 102 coupled together as shown in FIG. 1. Input power is received via input lines 138, 140 and supplied to the controller 132 and to the primary side windings 104 of the transformer 102 as will now be discussed. The controller 132 includes a relay controller (RC) 134 and a voltage sensor (VS) 136. The voltage sensor 136 measures the voltage across the input lines 138, 140 and reports the sensed voltage to the relay controller 134 which then energizes one of the first 110, second 112 or third 114 relays of the relay module 108. First relay 110 is energized if an input near 130V is detected and/or if the load-side voltage is higher than desired, second relay 112 is energized if an input near 110V is detected and/or if the load side voltage is slightly lower than desired, and third relay 114 is energized if an input near 100V input is detected and/or if the load side voltage is lower than desired. If an input voltage near 120 V is detected and/or no load side voltage adjustment is required, none of the relays (110, 112, 114) are energized and the top contacts of each of the relays (110, 112, 114) will be closed. In FIG. 1, the first relay 110 is shown as being energized with the lower contacts being closed and the upper contacts of the relay 110 being open; second relay 112 and third relay 114 are shown as being de-energized. This results in the hot utility line 138 being coupled to tap 122 of primary side windings 104 of transformer 102, and corresponds to an input voltage being detected near 130V The neutral line 140 is connected to the last tap 131 of the primary side 104 of the transformer 102. The hot line 138 is connected to one of the upper taps 130, 128, 126 or 122 depending on the sensed input voltage and/or load voltage with the number of windings through which the current will flow being increased for higher voltages with the lowest voltage, e.g., 100V, corresponding to the lowest tap 130 of the upper taps. In this way while the number of windings on the secondary side 106 of the transformer 102 will remain fixed, the number of windings on the primary side 104 in use at a given time and/or in a given location will vary based on voltage with the number of windings increasing as the input voltage increases and/or the offered load decreases. In this way the ratio of primary to secondary windings can be adjusted to reflect minor differences in the input voltage from the nominal expected 120 V AC input voltage.

While input tap switching to address minor differences in input voltage and/or output load can be beneficial, it complicates power supply design; particularly where it may be desirable to support very different input voltages, e.g., 120V and 240 volts inputs, in a single power supply.

As noted above, for a variety of reasons, it is often desirable to operate devices on 240V AC input power rather than 120V AC input power. While the input power side of a power supply might receive 120V or 240V power depending on where it is installed, the voltage supplied to the load side of the power supply is normally set to a fixed output value, e.g., 120V AC regardless of the input value. While the input side of a power supply may be intended to receive 120V or 240V in actuality depending on the load in a given area, the input power may be lower or higher than the 120V or 240 V nominal power but normally relatively close to the nominal input power. To allow for minor variations input voltage, the number of serial input taps of a power supply may be altered based on the sensed amount of current with a small number of windings being added in series or removed from the series input via the use of input relays. In the case were all the current goes serially though a single set of windings the gauge of windings used for a 120 power supply normally needs to be approximately twice that for a 240V power supply which provides the same amount of power. As should be appreciated heavier gauge windings tend to cost more than lighter gauge windings because of the increased amount of material required as well as the space required causing the transformer size to increase.

From the above it should be appreciated that 240 volt operation and power supplies have advantages in HFC cable network power supplies as well as in other applications as compared to lower voltage power supplies. For example, the power company service feed can use smaller conductor sizes. Furthermore the neutral need not be connected, making the supply less sensitive to local secondary load-based voltage swings. In addition, electrical codes that limit circuit breaker capacity under 120 volt operation, thus restricting excess power available for battery charging, are not a factor when 240V input is used, allowing faster recovery rates after battery standby events. Thus for a variety of reasons it is desirable to use 240V power supplies when possible, while 120V supplies may still be needed to be used in locations where a 240V power connection has not been provided. Thus, there is a need to be able support and/or provide power supplies that can work with a 240V input for some locations while 120V capable power supplies may be needed at other locations.

Figure 2:
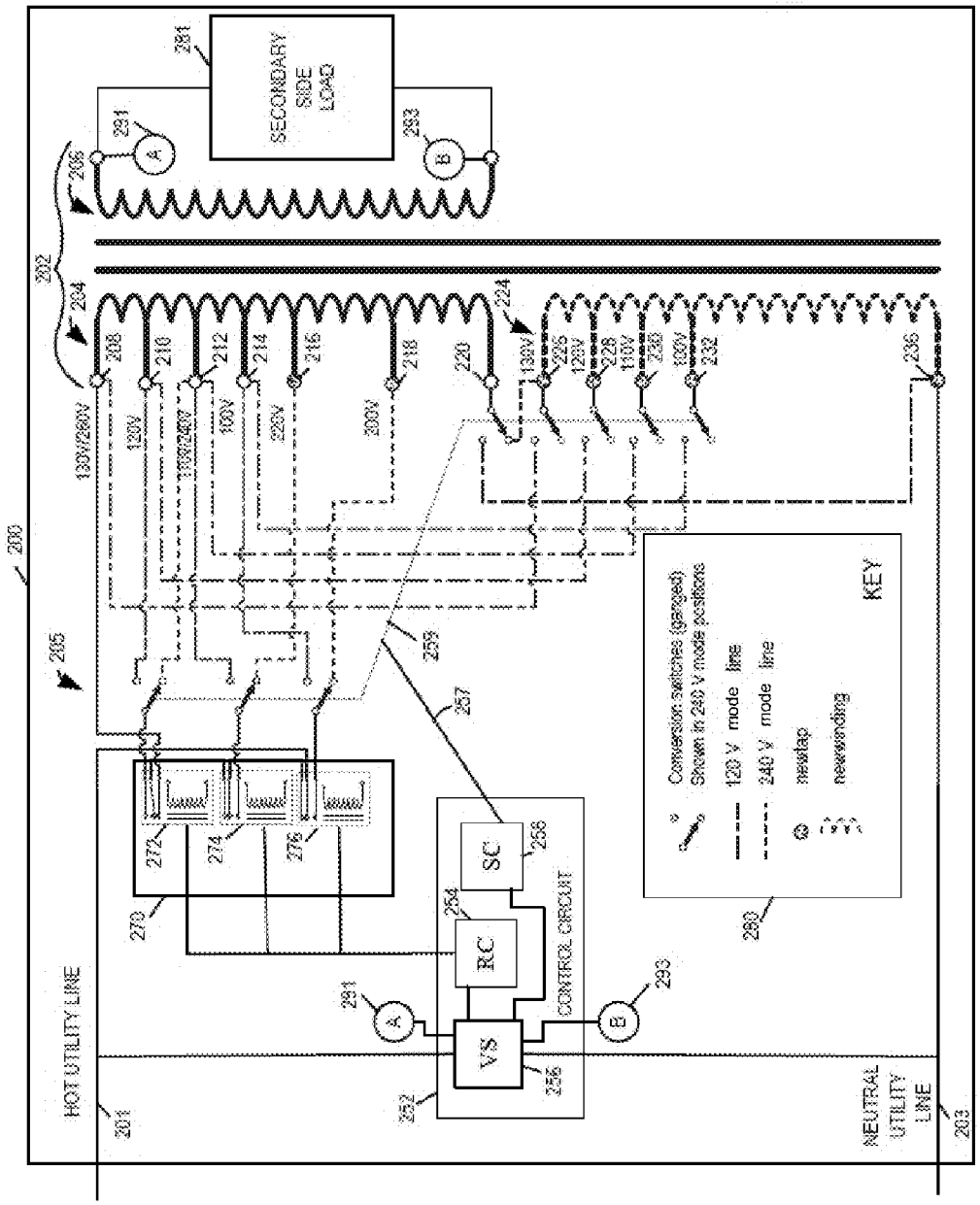
FIG. 2 illustrates an exemplary tap switching power supply that supports two different input voltage ranges, e.g., a 120V input range and a 240 volt input range, and which can automatically change between a first lower input voltage mode of operation to a second higher input voltage mode of operation based on the input voltage and use of a ganged switch.

FIG. 2 illustrates an exemplary power supply 200 implemented in accordance with one embodiment of the invention which supports automatic switching between multiple different input voltage ranges while still supporting tap switching based on input voltage and/or output voltage regulation while operating within a voltage range. For example, the FIG. 2 power supply 200 supports operation in a 120V mode of operation and a 240V mode of operation while still supporting tap switching for different voltages within the range supported by a given mode of operation. In FIG. 2, two utility lines 201, 203 supply power to the power supply. Line 201 is the hot line while line 203 is the neutral line. In the FIG. 2 embodiment the voltage sensor VS 256 measures the input voltage and/or the voltage across the load 281 connected to the secondary side 206 of the transformer 202. Terminal A 291 connects the voltage sensor to the top terminal of the secondary side 206 of the transformer 202 while terminal B 293 connects another input of the voltage sensor 256 to the bottom terminal of the secondary side 206 of transformer 202 allowing for the measurement by the voltage sensor 256 of the voltage across the secondary side 206 of transformer 202. The hot line 201 is coupled to a voltage sensor 256 of a control circuit 252 and to a hot line input of each of the first 272, second 274 and third 276 relays of relay module 270. The voltage sensor 256 senses the input voltage and/or the voltage across the load 281 on the output side of the transformer 202 and sends a signal to relay control 254 and to switch control 258 of the controller 252 based on the detected input voltage. Relay controller 254 controls switching of the relays 272, 274, 276 based on the input voltage within a range of operation for the mode in which the power supply is configured to operate by switch controller 258. For example, first relay 272 is energized for a detected input voltage within a 130V range for a 120 V mode of operation and for a detected input voltage within a 260V range for a 240V mode of operation. Second relay 274 is energized for a detected input voltage within a 110V range for a 120 V mode of operation and for a detected input voltage within a 220V range for a 240V mode of operation. Third relay 276 is energized for a detected input voltage within a 100V range for a 120 V mode of operation and for a detected input voltage within a 200V range for a 240V mode of operation. None of the relays (272, 274, 276) are energized for a detected input voltage within a 120V nominal range for a 120V mode of operation. None of the relays (272, 274, 276) are energized for a detected input voltage within a 240V nominal range for a 240V mode of operation.

The control of the relays (272, 274, 276) in relay module 270 may be in accordance with the relay control routine shown in FIG. 5. Switch controller 258 controls, via the control lines 257 and 259, the set of ganged switches represented by reference number 205 to switch between a first position corresponding to a first voltage range and first mode of operation and a second position corresponding to a second voltage range and second mode of operation. In FIG. 2 the ganged set of switches 205 is shown set in a 240 V mode range of operation while the relay module 270 is shown set to a position corresponding to the 260V input because in the FIG. 2 example the sensed input voltage was in the 260V input range. Note that these sensor voltages correspond to voltage ranges with some amount of hysteresis (overlap depending on rising or falling trending), in some embodiments, to prevent oscillation between selected taps. Key 280 explains that the ganged switch control line 259 is set to position the switches 205 for 240 V mode range operation. The ganged switches 205 are set to the upper connections when the power supply is to operate in the 120V mode range of operation. As indicated by key 280 lines used during 120V mode operation, which may be switched into use, are identified using a sequence of long and short dashes, while lines used during 240V mode operation and which may be switched into use are shown using dashed lines made up of dashes of a consistent length.

The transformer 202 in the FIG. 2 embodiment includes a single set of secondary load side windings 206 and two sets of primary windings, a first set of primary windings 204 and second set of primary windings 224. In accordance with the invention, the ganged switch 205 can be used to configure at least a portion of the first set of primary windings 204 to be in series with the second set of primary windings 224 as is the case during a 240V mode of operation, and the ganged switch 205 can be used to configure at least a portion of the first set of primary windings to be arranged in parallel with at least a portion of the second set of primary windings as in the case of a 120V mode of operation. Thus during the 120V mode of operation portions of the first and second of the transformer windings (204, 224) are used in parallel with each taking some of the current, e.g., half the current, while during the higher voltage mode of operation, the 240 mode of operation, the at least a portion of the windings 204 are used in series with windings 224. Tap switching is supported within each of the supported voltage ranges. By the switchable serial/parallel configuration of primary tap windings, multiple voltage ranges can be supported without the need for having independent windings for each voltage range. Thus the apparatus shown in FIG. 2 makes efficient use of the transformer windings and space needed for these windings and thus materials used to manufacture a transformer.

The first set of primary transformer windings 204 includes a first set of taps 208, 210, 212, 214, 216, 218, and 220. The first set of taps includes a first lower tap 220 and a first plurality of upper taps 208, 210, 212, 214, 216, 218 where each of the first plurality of upper taps corresponds to a different input voltage but where a single tap may, and sometimes does, correspond to two voltages, one voltage for each mode of voltage range operation. For example, tap 208 is used when the input voltage is 130V or 260V, tap 210 is used for 120 V, tap 212 is used for 110V or 240V, tap 214 is used for 100V or 220V, tap 216 is used for 220V and tap 218 is used for 200V. Tap 220 is the lower tap for the first set of taps included in windings 204 and is connected to the neutral conductor for the 120V range mode operation, but to the first tap 226 of the second set of taps included in windings 224 for 240 volt mode operation, and thereby connects the second set of taps of windings 224 in series with the first set of taps of windings 204.

The second set of primary transformer windings 224 includes a second set of taps 226, 228, 230, 232, 236. The second set of taps of windings 224 includes second lower tap 236, which is coupled to the neutral utility line 203, and a second plurality of upper taps 226, 228, 230, 232, each of the second plurality of upper taps corresponding to a different input voltage, a single secondary upper tap may correspond two voltages one for each mode of voltage range operation. Different input voltages supported by the second plurality of upper taps during operation in a first voltage range also being supported by the first plurality of upper taps. Consider for example that tap 226 is used for 130V input during the first mode of operation and will also be used during 240V mode input as the first tap placed in series with the upper taps of windings 204. Tap 226 will be used for 120 V operation, tap 230 used for 110 V operation and tap 232 used for 100 V operation. As can be appreciated, the lower windings 224 are used in parallel with the upper windings 204 during the lower voltage mode range operation, e.g., 120V range operation.

As should be appreciated the power supply 200 can automatically switch between 120V range mode operation and 240V range mode operation while still supporting a plurality of input voltages in each range using tap switching to alter the number of primary windings used based on the input voltage within the voltage range in which the power supply is configured to operate. Importantly, the exemplary three relays (272, 274, 276) included in relay block 270 are sufficient to provide tap switching functionality in both configuration cases (e.g. 120 V mode and 240 V mode operation), as opposed to certain other possible design configurations which may rely on additional relays and incur additional cost as a result.

While the FIG. 2 embodiment has the advantage of automatic range switching, it involves the use of ganged switch 205. In many cases, the input voltage range will remain constant for the full time a power supply is installed. In such a case it may be desirable to avoid the use of the ganged switch 205 for cost and/or other reasons.

Figure 3:
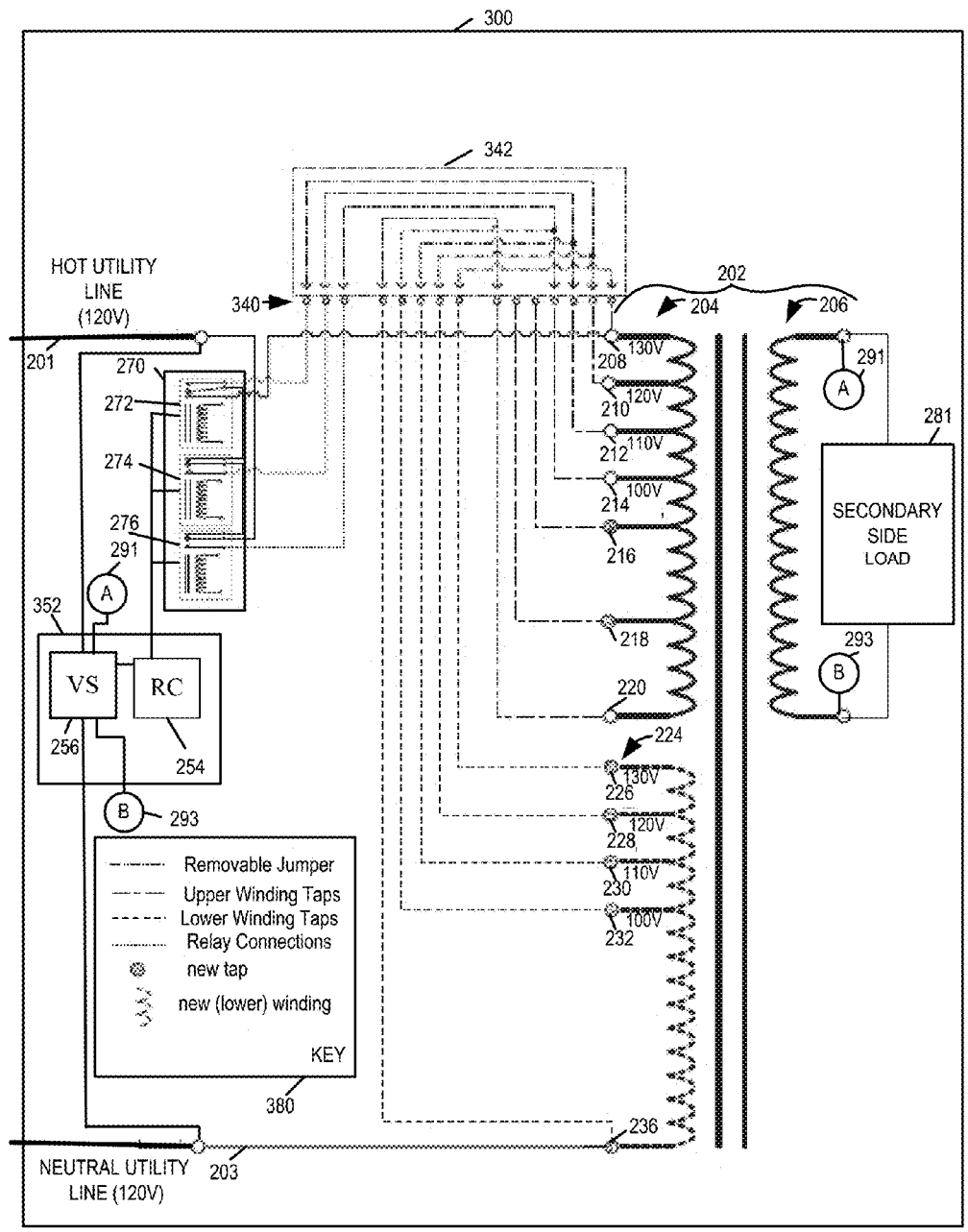
FIG. 3 illustrates an exemplary power supply which is configured manually via use of a first tap interconnect plug to operate in a first low voltage, e.g., 120 V input range, mode of operation.
Figure 4:
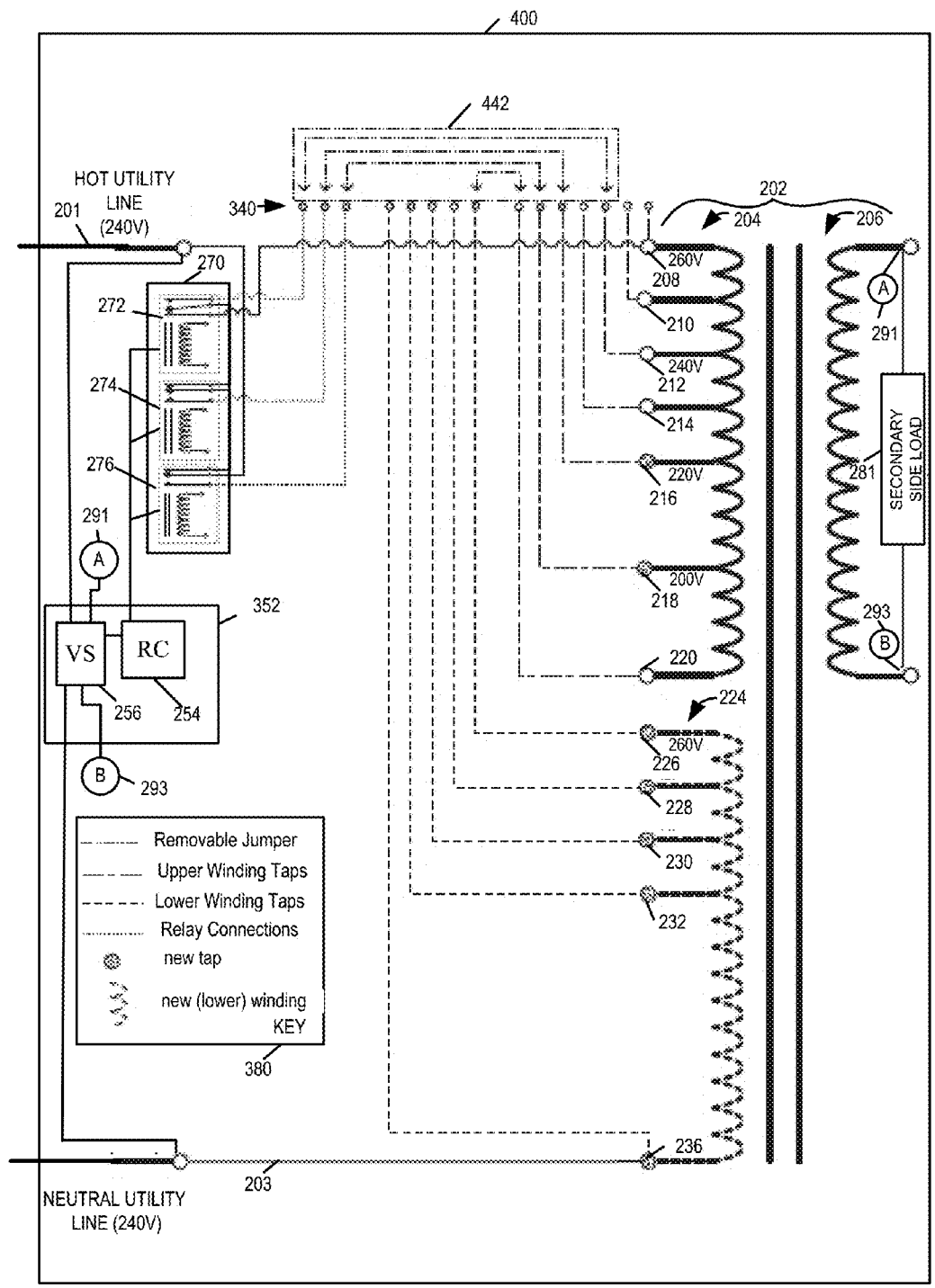
FIG. 4 illustrates a power supply of the type shown in FIG. 3 but with a second interconnect plug corresponding to a second input voltage range, e.g., a 240 volt range, being used to configure the power supply and tap interconnects in a manner which configures the power supply to operate in the second input voltage range.

FIGS. 3 and 4 show alternative embodiments in which power supplies 300, 400 are configured through the use of a connector plug 342 or 442 which makes the transformer tap connections which are desired for a given voltage range. The connector in the form of a plug 342 or 442 sets the power supply configuration to the voltage range in which the power supply is to operate. Thus an installer or service technician can bring a power supply with multiple connector plugs 342, 442 and by inserting the plug corresponding to the desired voltage range simply and easily configure the power supply to operate at the desired voltage range, e.g., 120V or 240V.

In the FIGS. 3 and 4 embodiments elements which are the same or similar to those shown and described with regard to FIG. 2 will be identified using the same reference numbers and are not described again in detail for the purposes of brevity. For example the transformer 202 and relay module 270 may also be in the embodiments and power supplies shown in FIGS. 3 and 4 and thus will not be described again.

The control circuit 352 used in each of the FIGS. 3 and 4 embodiments is similar to the control circuit 252 of the FIG. 2 embodiment but since connector plugs 342, 442 are used in the FIGS. 3 and 4 embodiments there is no need for the switch control 258 and thus it is omitted from the control circuits 352 used in the power supplies 300, 400 shown FIGS. 3 and 4, respectively.

In FIG. 3 which is directed to showing power supply 300 configured for 120V mode operation, it can be seen that the connector plug 342 when inserted into connector 340 connects the transformer taps and other elements to operate in 120V mode operation with portions of the upper 204 and lower 224 primary windings being used in parallel. In the 120V mode range of operation taps 216, 218 go unused and are thus not connected to any of the jumpers in the connector plug 342 which interconnect the pins of terminal 340. Key 380 identifies removable jumper internal connections as dot dot dash lines, upper winding 204 tap connections to terminal 340 as short-dash long-dash lines, lower winding 224 tap connections to terminal 340 as consistent length dash lines, relay to terminal 340 connections as dotted lines, new taps as dotted circles, and new (lower) primary side windings 224 as a dashed line winding.

In FIG. 4 which is directed to showing power supply 400 configured for 240V mode operation, it can be seen that the connector plug 442 when inserted into connector 340 connects the transformer taps and other elements to operate in 240V mode operation with portions of the upper 204 and lower 224 primary windings being used in series. In the 240V mode range of operation taps 208, 210, 214, 228, 230,232 go unused with the connector connecting tap 220 to tap 226 to form a series circuit.

Connector plug 342 may be and in some embodiments is labeled with a first voltage, e.g., 120V to indicate its nominal voltage range and identified with a first color, e.g., green. Connector plug 442 may be and in some embodiments is labeled with a second voltage, e.g., 240V to indicate its nominal voltage range and identified with a second color, e.g., red. Thus the voltage range to which each plug corresponds 342, 442 may be clearly indicated and the color used to further distinguish between the two plugs and corresponding voltage ranges.

By providing plugs with multiple input jumpers and a fixed pin configuration which matches to the connector 340, errors in how to rewire the power supply for the different voltage ranges are avoided since the installer need not understand the wiring interconnect for each voltage range and merely needs to insert into connector 340 the connector plug 342 or 442 corresponding to the desired voltage range of operation.

Figure 5A:
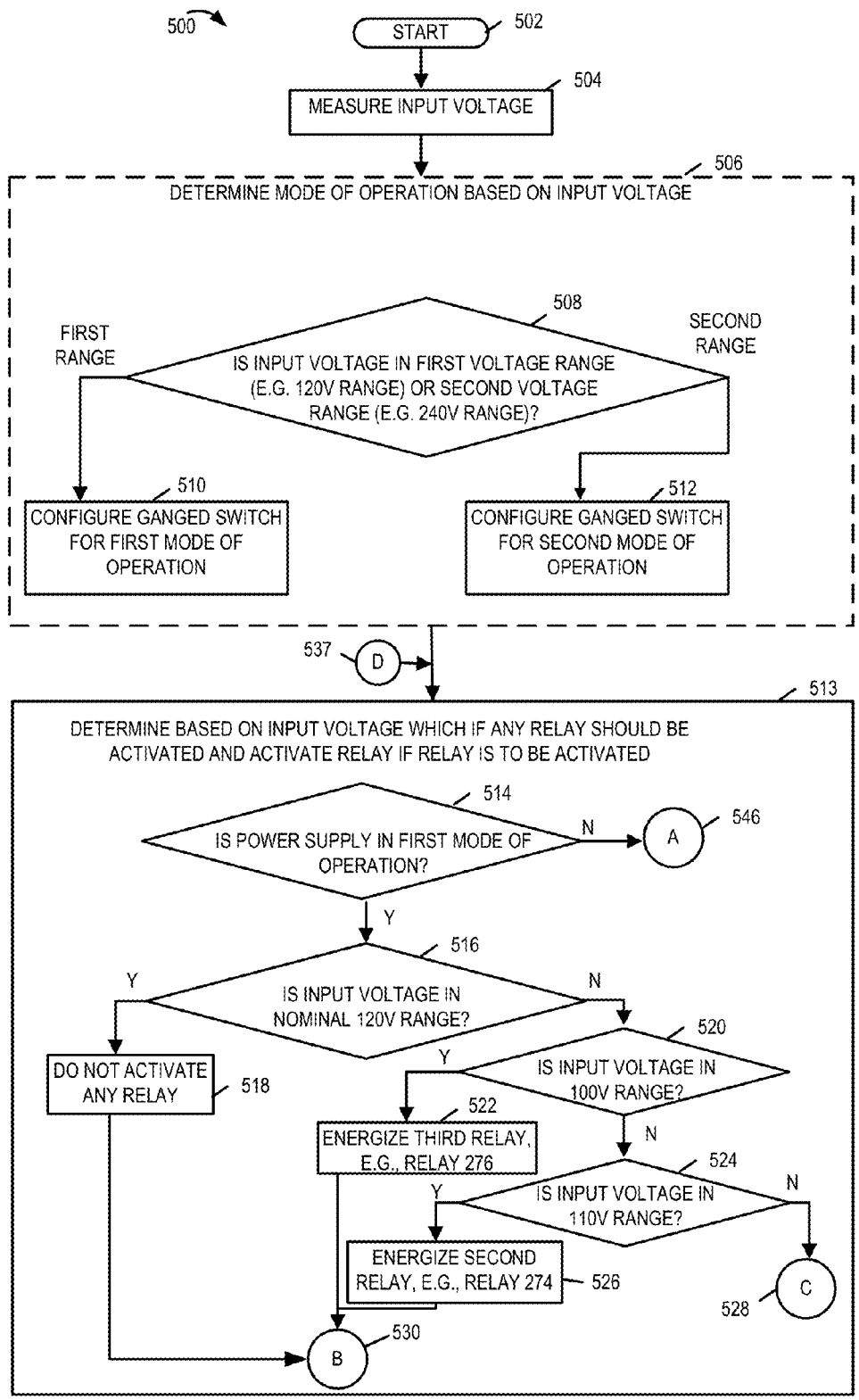
FIG. 5A is a first part of a flowchart of an exemplary method of operating a power supply in accordance with an exemplary embodiment.
Figure 5B:
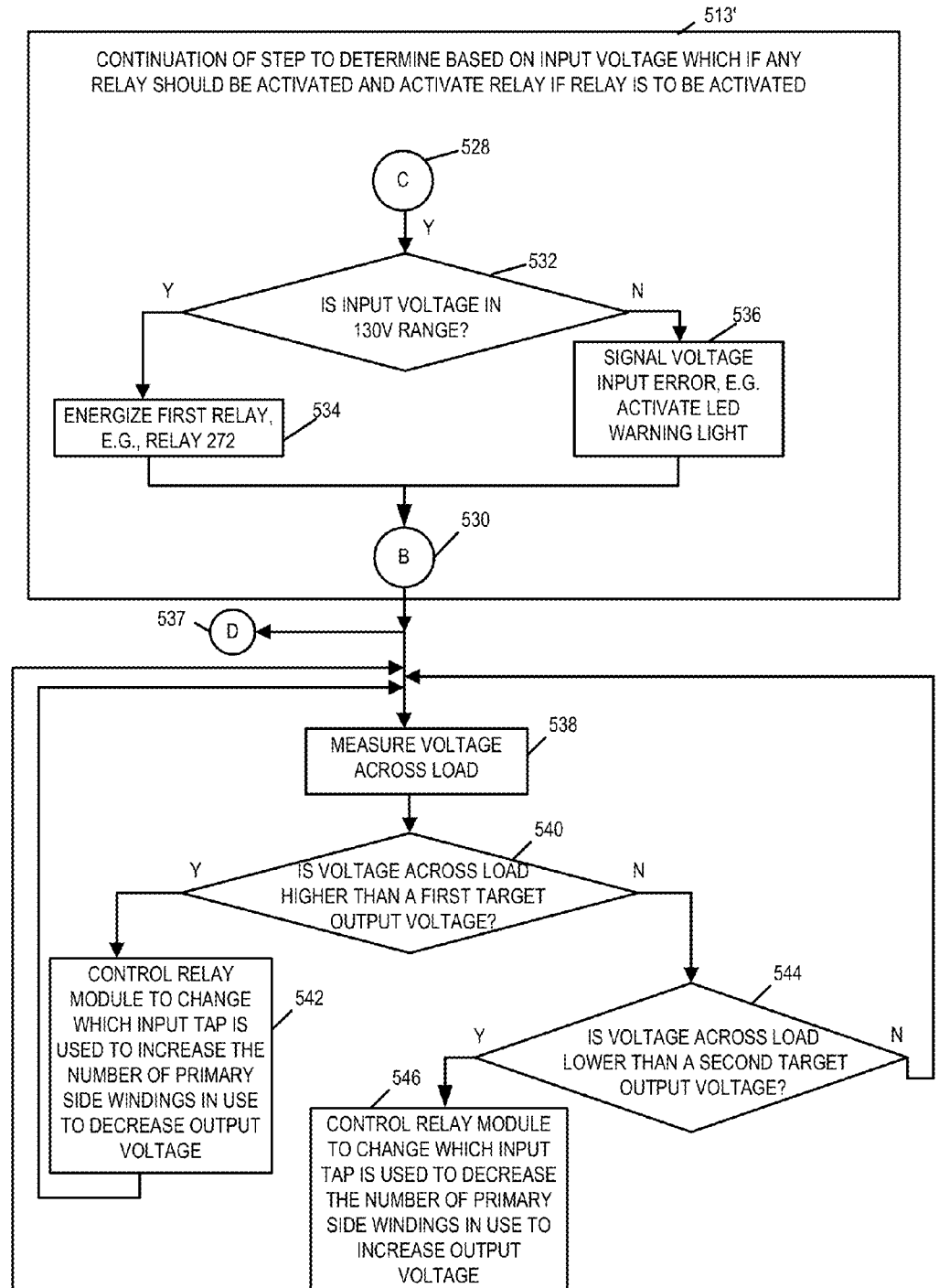
FIG. 5B is a second part of a flowchart of an exemplary method of operating a power supply in accordance with an exemplary embodiment.
Figure 5C:
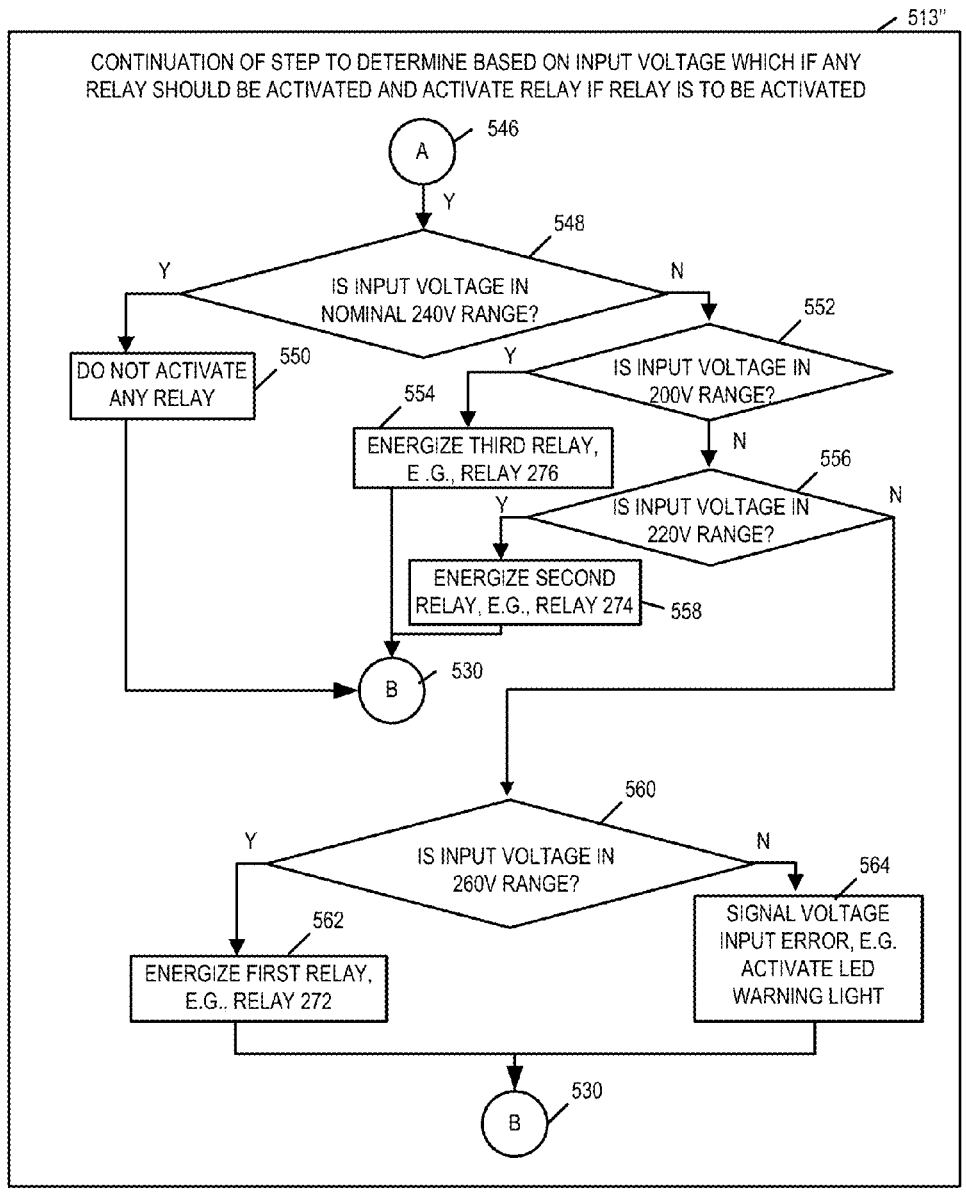
FIG. 5C is a third part of a flowchart of an exemplary method of operating a power supply in accordance with an exemplary embodiment.

FIG. 5, comprising the combination of FIG. 5A, FIG. 5B and FIG. 5C, is a flowchart 500 of an exemplary method of operating a power supply in accordance with an exemplary embodiment. The power supply is, e.g., one of power supply 200 of FIG. 2, power supply 300 of FIG. 3 or power supply 400 of FIG. 4. In various embodiments, flowchart 500 implements a relay control routine, e.g., to control which one if any of the relays (272, 274, 276) in relay module 270 are to be energized at a given time, and optionally includes a mode control routine, e.g., to control switching between a 120V mode range of operation and a 240V mode range of operation. Operation starts in step 502 and proceeds to step 504.

In step 504, the power supply measures the input voltage, e.g., voltage sensor 256 or control circuit 252 or voltage sensor 256 of control circuit 352 measures the input voltage across the hot and neutral utility lines (201, 203). In some embodiments, e.g., the embodiment of FIG. 3, operation proceeds from step 504 to step 506. In other embodiments, e.g., the embodiment of FIG. 4 or FIG. 5, operation proceeds from step 504 to step 513. In step 506 the power supply determines the mode of operation based on the input voltage. Step 506 includes steps 508, 510 and 512. In step 508 the power supply determines if the input voltage is in a first voltage range, e.g., a 120V range, or in a second voltage range, e.g., a 240V range. If the determination is that the input voltage is in the first range, then operation proceeds from step 508 to step 510, in which the power supply configures the ganged switch for a first mode of operation, e.g., switching controller 258 configures the ganged switch 205, via control lines 257, 259 for a 120V range mode of operation. However, if the determination is that the input voltage is in a second voltage range, then operation proceeds from step 508 to step 512, in which the power supply configures the ganged switch for a second mode of operation, e.g., switching controller 258 configures the ganged switch 205, via control lines 257, 259 for a 240V range mode of operation. FIG. 2 illustrates the ganged switch 205 configured to the second mode of operation corresponding to the 240V range. Operation proceeds from step 506 to step 513.

Step 513 includes step 513' and step 513". In step 513 the power supply determines based on input voltage which if any relay should be activated and activates a relay if a relay is to be activated. Step 513 includes steps 514, 516, 518, 520, 522, 524, 526, 532, 534, 536, 548, 550, 552, 554, 556, 558, 560, 562, and 564.

In step 514 the power supply determines if the power supply is in a first mode of operation, e.g., a 120V mode of operation. In some embodiments, the mode determination has been previously made in step 506 based on a measured input voltage, and that determination is carried over into step 514. In other embodiments, in step 514 the power supply performs a mode determination based on an input voltage, e.g., voltage sensor 256 measures the input voltage across the input power lines (201, 203) and determines that the power supply is in the first mode of operation if the sensed input voltage is within a first voltage range, e.g., a 120V input voltage range. If the determination of step 514 is that the power supply is in the first mode of operation, then operation proceeds from step 514 to step 516; otherwise operation proceeds from step 514 via connecting node A 546 to step 548.

In step 516 the power supply determines if the input voltage is in the nominal 120V range. If the determination is that the input voltage is in the nominal 120V range, then operation proceeds from step 516 to step 518 in which the power supply is controlled to not activate any relay, e.g., relay controller 254 does not energize any of relays 272, 274, 276. This results in the input voltage hot line 201 being coupled to tap 210 and tap 228. However, if the determination is that the input voltage is not in the nominal 120V range, then operation proceeds from step 516 to step 520. In step 520 the power supply checks to determine if the input voltage is in the 100V range. If the determination of step 520 is that the input voltage is in the 100V range, then operation proceeds from step 520 to step 522 in which the power supply energizes a third relay, e.g., relay 276, e.g., relay controller 254 controls relay 276 to be energized; and relay controller 254 controls relay 272 and relay 274 to be in a de-energized state. This results in the input voltage hot line 201 being coupled to tap 214 and tap 232. Returning to step 520, if the determination of step 520 is that the input voltage is not in the 100V range, then operation proceeds from step 520 to step 524. In step 524 the power supply determines if the input voltage is in the 110V range. If the determination of step 524 is that the input voltage is in the 110V range, then operation proceeds from step 524 to step 526 in which the power supply energizes a second relay, e.g., relay 274, e.g., relay controller 254 controls relay 274 to be energized; and relay controller 254 controls relay 272 and relay 276 to be in a de-energized state. This results in the input voltage hot line 201 being coupled to tap 212 and tap 230. Returning to step 524, if the determination of step 524 is that the input voltage is not in the 110V range, then operation proceeds from step 524, via connecting node C 528, to step 532. In step 532 the power supply determines if the input voltage is in the 130V range. If the determination of step 532 is that the input voltage is in the 130V range, then operation proceeds from step 532 to step 534 in which the power supply energizes a first relay, e.g., relay 272, e.g., relay controller 254 controls relay 272 to be energized, and relay controller 254 controls relay 274 and relay 276 to be in a de-energized state. This results in the input voltage hot line 201 being coupled to tap 208 and tap 226. Returning to step 532, if the determination of step 532 is that the input voltage is not in the 130V range, then operation proceeds from step 532 to step 536 in which the power supply determines that there is a signal voltage input error. In some such embodiments, in step 536 the power supply activates an LED warning light indicating a signal voltage error, e.g., indicating that the input voltage is outside acceptable limits.

Returning to step 548, in step 548 the power supply determines if the input voltage is in the nominal 240V range. If the determination is that the input voltage is in the nominal 240V range, then operation proceeds from step 548 to step 550 in which the power supply is controlled to not activate any relay, e.g., relay controller 254 does not energize any of relays 272, 274, 276. This results in the input voltage hot line 201 being coupled to tap 212. However, if the determination of step 548 is that the input voltage is not in the nominal 240V range, then operation proceeds from step 548 to step 552. In step 552 the power supply check if the input voltage is in the 200V range. If the determination of step 552 is that the input voltage is in the 200V range, then operation proceeds from step 552 to step 554 in which the power supply energizes the third relay, e.g., relay 276, e.g., relay controller 254 controls relay 276 to be energized, and relay controller 254 controls relay 272 and relay 274 to be in a de-energized state. This results in the input voltage hot line 201 being coupled to tap 218. Returning to step 552, if the determination of step 552 is that the input voltage is not in the 200V range, then operation proceeds from step 552 to step 556. In step 556 the power supply determines if the input voltage is in the 220V range. If the determination is that input voltage is in the 220V range, then operation proceeds from step 556 to step 558, in which the power supply energizes the second relay, e.g., relay 274, e.g., relay controller 254 controls 274 to be energized, and relay controller 254 controls relay 272 and relay 276 to be in a de-energized state. This results in the input voltage hot line 201 being coupled to tap 216. Returning to step 556, if the determination of step 556 is that the input voltage is not in the 220V range, then operation proceeds from step 556 to step 560. In step 560 the power supply determines if the input voltage is in the 260V range. If the determination is that input voltage is in the 260V range, then operation proceeds from step 560 to step 562, in which the power supply energizes the first relay, e.g., relay 272, e.g., relay controller 254 controls relay 272 to be energized, and relay controller 254 controls relay 274 and relay 276 to be in a de-energized state. This results in the input voltage hot line 201 being coupled to tap 208. Returning to step 560, if the determination of step 560 is that the input voltage is not in the 260V range, then operation proceeds from step 560 to step 564, in which the power supply determines that there is a signal voltage input error. In some such embodiments, in step 564 the power supply activates an LED warning light indicating a signal voltage error, e.g., indicating that the input voltage is outside acceptable limits. Operation proceeds from one of steps 518, 522, 526, 534, 536, 550, 554, 558, 562, or 564, via connecting node B 530 to step 538 and, via connecting node D 537, to the input of step 513.

In step 538 the power supply measures the voltage across a load, e.g., voltage sensor 256 of control circuit 252 or 352 measures the voltage across load 281 via sense terminals (291, 293). Operation proceeds from step 538 to step 540. In step 540 the power supply determines if the voltage across the load is higher than a first target output voltage. If the determination of step 540 is that the voltage across the load is higher the first target output voltage, then operation proceeds from step 540 to step 542 in which the power supply controls the relay module to change which input tap is used to increase the number of primary side windings in use to decrease the output voltage, e.g., relay control 254 controls relay module 270 to make a change to use a different tap to decrease the output voltage. However, if the determination of step 540 is that the voltage across the load is not higher than the first target output voltage, then operation proceeds from step 540 to step 544. In step 544 the power supply determines if the voltage across the load is lower than a second target output voltage. The second target output voltage is lower than the first target output voltage. If the determination is that the voltage across the load is lower the second target output voltage, then operation proceeds from step 544 to step 546 in which the power supply controls the relay module to change which input tap is used to decrease the number of primary side windings in use to increase the output voltage, e.g., relay control 254 controls relay module 270 to make a change to use a different tap to increase the output voltage. However, if the determination of step 546 is that the voltage across the load is not lower than the second target output voltage, then operation proceeds from step 546 to step 538 to perform another measurement of the voltage across the load, e.g., at a later point in time. Operation proceeds from step 542 or step 546 to step 538 to perform another measurement of the voltage across the load, e.g., at a later point in time.

In some exemplary embodiment, the first mode of operation corresponds to a 120V input voltage range, e.g., 95V to 135V; and the second mode of operation corresponds to a 240V input voltage range, e.g., 190V to 270V. In some such embodiments, the nominal 120V range is 115V to 125V; the 100V range is 95V to 105V; the 110V range is 105V to 115V; the 130V range is 125V to 135V; the nominal 240V range is 230V to 250V; the 200V range is 190V to 210V; the 220V range is 210 to 240V; and the 260V range is 250V to 270V. In some embodiments are varied slightly over time, e.g., to introduce hysteresis and to prevent frequent relay switching back and forth due to a voltage near a range boundary. In some embodiments, controlling a relay module to change which tap is used to increase or decrease the number of primary windings in use, in response to a sensed voltage across the load, includes modifying a voltage range to force the relay module to change to a different alternative tap.

Numerous variations on the above described embodiments are possible.

While a logical sequencing of the processing steps of the exemplary embodiments of the methods, routines and sub-routines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a power supply including a transformer with multiple alternative input taps, said power supply having multiple input range capability, said power supply supporting at least two disjoint input voltage ranges corresponding to different modes, i.e. a power supply with multiple input range capability included in a media content distribution system. Various embodiments are also directed to methods, e.g., a method of controlling a power supply including a transformer with multiple alternative input taps, said power supply having multiple input range capability, said power supply supporting at least two disjoint input voltage ranges corresponding to different modes, i.e. a power supply with multiple input range capability used in the distribution of media content, e.g., video on demand audio and/or video content. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method. In some embodiments devices, elements and/or modules that are configured to perform various functions are implemented as circuits, e.g., with a different circuit for each function being implemented in some but not necessarily all embodiments.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware, e.g., in circuitry, ASICs, ICs, etc. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A multi-mode transformer system supporting at least first and second modes, the system comprising:
    a first set of primary transformer windings including a first set of taps, said first set of taps including a first lower tap and a first plurality of upper taps, each of the first plurality of upper taps corresponding to a different input voltage during a first (120V) voltage range mode of operation;
    a second set of primary transformer windings including a second set of taps, said second set of taps including a second lower tap and a second plurality of upper taps, each of the second plurality of upper taps corresponding to a different input voltage during said first(120V) voltage range mode of operation, different input voltages supported by said second plurality of upper taps also being supported by the first plurality of upper taps;
    a relay assembly configured to control which tap in the first plurality of upper taps is connected to a first input line during said first (120V) voltage range mode of operation and which tap in the second plurality of upper taps is connected to the first input line during the first (120V) voltage range mode of operation, said relay assembly being configured to control which tap in the first plurality of upper taps is connected to the first input line during a second (240V) voltage range mode of operation, the upper taps in the second plurality of upper taps not being connected directly to said first input line during the second (240V) voltage range mode of operation;
    a secondary transformer winding with output terminals for coupling to a load; and
    one of i) a switch assembly or ii) a jumper device configured to connect at least two taps of said first and second set of taps, said switch assembly or jumper device being configured to connect the first and second lower taps together in parallel to a second input line when operating in said first (120V) voltage range mode of operation and to connect, in series, the first lower tap of the first set of taps to the first upper tap of said second set of taps during said second (240V) voltage range mode of operation, the second lower tap being coupled to the second input line during both said first and second voltage range modes of operation.

2. The multi-mode transformer system of claim 1, further comprising:
    a voltage detection circuit; and
    a relay controller configured to activate one of a plurality of relays in said relay assembly when either an input voltage differs from a first input voltage or an output voltage deviates from a target output voltage when operating in the first (120V) voltage range mode of operation and configured to activate one of the relays in the plurality of relays when operating in the second (240V) voltage range mode of operation when either an input voltage differs from a second input voltage (240V) or the output voltage deviates from the target output voltage.

3. The multi-mode transformer system of claim 2, wherein a number of transformer windings between second and third upper taps of said first plurality of upper taps is the same as a number of transformer windings between second and third upper taps of said second plurality of upper taps.

4. The multi-mode transformer system of claim 3, wherein a number of transformer windings between third and fourth upper taps of said first plurality of upper taps is the same as a number of transformer windings between third and fourth upper taps of said second plurality of upper taps.

5. The multi-mode transformer system of claim 4, wherein said first plurality of upper taps includes at least two more taps than said second plurality of upper taps.

6. The multi-mode transformer system of claim 5, wherein said at least two more taps correspond to voltages for which taps are not included in said second set of upper taps.

7. The multi-mode transformer system of claim 5, wherein said first (120V) voltage range mode of operation is a 120 volt input mode of operation and wherein said second (240V) voltage range mode of operation is a 240 volt input mode of operation.

8. The multi-mode transformer system of claim 1, wherein a number of transformer windings between first and second upper taps of said first plurality of upper taps is the same as a number of transformer windings between first and second upper taps of said second plurality of upper taps.

9. The multi-mode transformer system of claim 1, wherein said multi-mode transformer system includes said jumper device, said jumper device having a first interconnect configuration when the multi-mode transformer system is used in the first (120V) voltage range mode of operation and a second interconnect configuration when the multi-mode transformer system is used in the second (240V) voltage range mode of operation.

10. The multi-mode transformer system of claim 1, wherein said jumper device is a plug connector that is manually selected and installed at a field location where said multi-mode transformer system is installed based on whether the field location has a 120 volt line or a 240 volt line.

* * * * *